United States Patent
Chiang

(10) Patent No.: US 7,255,550 B2
(45) Date of Patent: Aug. 14, 2007

(54) PRESS-MOLDING MOLD

(75) Inventor: Tsung-Wei Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/416,548

(22) Filed: May 3, 2006

(65) Prior Publication Data

US 2006/0263464 A1    Nov. 23, 2006

(30) Foreign Application Priority Data

May 20, 2005    (CN)    ............... 200510034756

(51) Int. Cl.
*B29D 11/00*    (2006.01)
*C03B 11/08*    (2006.01)

(52) U.S. Cl. ............ 425/193; 425/352; 425/395; 425/408; 425/808; 65/305

(58) Field of Classification Search ............... 425/353, 425/808, 193, 352, 395, 408–411, 415, 423; 65/305; 264/1.24, 1.32
See application file for complete search history.

(56) References Cited

U.S. PATENT DOCUMENTS

| | | | | |
|---|---|---|---|---|
| 3,214,254 A | * | 10/1965 | Remington | ............ 65/32.5 |
| 4,883,528 A | * | 11/1989 | Carpenter et al. | ............ 65/275 |
| 4,929,265 A | * | 5/1990 | Carpenter et al. | ............ 65/64 |
| 5,202,156 A | | 4/1993 | Yamamoto et al. | |
| 5,211,969 A | * | 5/1993 | Yoshimura | ............ 425/395 |
| 5,759,221 A | * | 6/1998 | Kashiwagi et al. | ............ 65/102 |
| 6,994,538 B2 | * | 2/2006 | Haidl et al. | ............ 425/180 |
| 7,065,986 B2 | * | 6/2006 | Meissner | ............ 65/323 |
| 2003/0056544 A1 | * | 3/2003 | Yamanaka | ............ 65/305 |
| 2004/0096536 A1 | * | 5/2004 | Meissner | ............ 425/195 |
| 2004/0178541 A1 | * | 9/2004 | Kelly et al. | ............ 264/496 |
| 2005/0212154 A1 | * | 9/2005 | Inoue et al. | ............ 264/1.32 |
| 2006/0073232 A1 | * | 4/2006 | Wang | ............ 425/406 |

* cited by examiner

*Primary Examiner*—James P. Mackey
*Assistant Examiner*—Dimple Bodawala
(74) *Attorney, Agent, or Firm*—Jeffrey T. Knapp

(57) ABSTRACT

A press-molding mold includes a first mold (10), a second mold (20), a complementary element (30) arranged between the first mold (10) and the second mold (20), a washer (40) arranged between the second mold (10) and the complementary element (30), and a bushing (50) for receiving the first mold (10), the second mold (20), the complementary element (30) and the washer (40) therein. The first mold (10) includes a first molding surface (132) and a second molding surface (134) surrounding the first molding surface (132). The second mold (20) includes a third molding surface (232) spatially corresponding to the first molding surface (132). The complementary element (30) includes a fourth molding surface (321) spatially corresponding to the second molding surface (134). The washer (40) has a thickness custom-tailored for maintaining a desired distance between the fourth molding surface and the second molding surface.

17 Claims, 5 Drawing Sheets

US 7,255,550 B2

PRESS-MOLDING MOLD

TECHNICAL FIELD

The present invention generally relates to molds, and more particularly to a press-molding mold for manufacturing optical articles.

BACKGROUND

Molds are widely used for manufacturing optical articles, such as light guide plates, lenses, and so on. Referring to FIG. I, a conventional lens mold 100a includes a first mold 12, a second mold 14, a positioning element 16 and a bushing 18 for receiving the first mold 12, the second mold 14 and positioning element 16 therein.

The first mold 12 includes a first molding portion 120 extending from one end thereof The first molding portion 120 defines a first molding surface 122 and an end surface (not labeled) adjacent to the first molding surface 122. The second mold 14 includes a second molding portion 140 extending from one end thereof The second molding portion 140 defines a second molding surface 142 corresponding to the first molding surface 122 and an end surface (not labeled) adjacent the second molding surface 142. The positioning element 16 is annular shaped.

In a glass lens molding process, the second mold 14 is inserted inside the bushing 18; the positioning element 16 is placed around the second molding portion 140 of the second mold 14; then a glass preform is put on the second molding surface 142; the first mold 12 is inserted into the bushing 18 to press the glass preform, thereby obtaining a predetermined glass lens. The obtained glass lens has a center portion and a peripheral portion. According to the conventional lens mold 100a, by adjusting a distance between the first molding surface 122 and the second molding surface 142, a thickness of the center portion and the peripheral portion can be changed. Thus, a number of differing glass lenses with various thicknesses can be obtained.

However, when the distance between the first molding surface 122 and the second molding surface 142 is changed, the thickness of the center portion and that of the peripheral portion will be changed also. In pressing, a shrinkage of the center portion is different from that of the peripheral portion, so that simultaneously changing the distance between the first molding surface 122 and the second molding surface 142 will give the center portion and the peripheral portion different levels of thickness. Therefore, although the conventional lens mold 100a can adjust the thickness of the obtained glass lenses, errors will occur. In order to obtain a precise thickness change in the center portion and the peripheral portion, a mold allowing separate changing of the thickness of the center portion and of the peripheral portion is desired.

Therefore, a press-molding mold which can separately adjust the thickness of the center portion and the peripheral portion is provided.

SUMMARY

A press-molding mold includes a first mold, a second mold, a complementary element arranged between the first mold and the second mold, a washer arranged between the second mold and the complementary element, and a bushing for receiving the first mold, the second mold, the complementary element and the washer therein. The first mold includes a first molding surface and a second molding surface surrounding the first molding surface. The second mold includes a third molding surface spatially corresponding to the first molding surface. The complementary element includes a fourth molding surface spatially corresponding to the second molding surface. The washer has a thickness custom-tailored for maintaining a desired distance between the fourth molding surface and the second molding surface.

Advantages and novel features will become more apparent from the following detailed description when taken in conjunction with the accompanying drawing.

BRIEF DESCRIPTION OF THE DRAWINGS

Many aspects of the press-molding mold can be better understood with reference to the following drawings. The components in the drawings are not necessarily drawn to scale, the emphasis instead being placed upon clearly illustrating the principles of the present press-molding mold. Moreover, in the drawings, like reference numerals designate corresponding parts throughout the several views.

DETAILED DESCRIPTION OF THE PREFERRED EMBODIMENT

Figure 1:
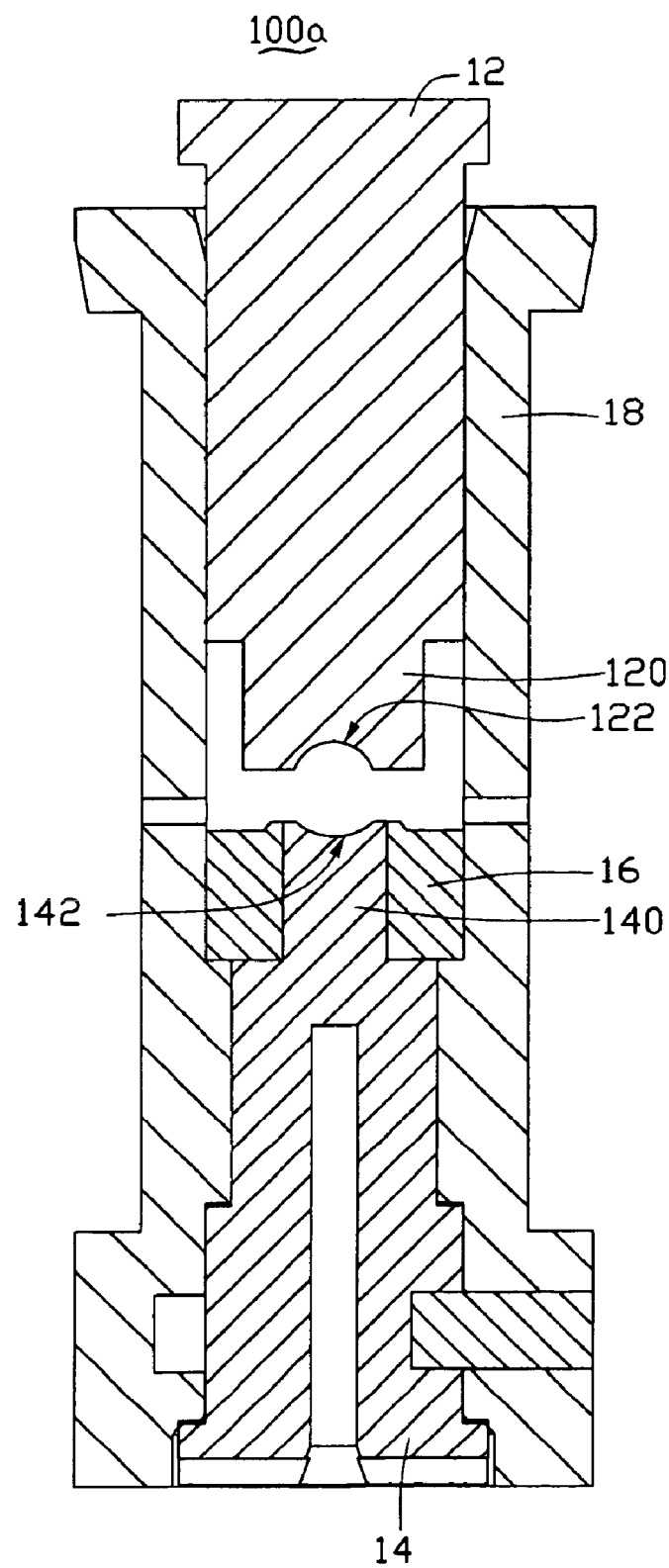
FIG. 1 is a schematic, cross-sectional view of a conventional press-molding mold.
Figure 2:
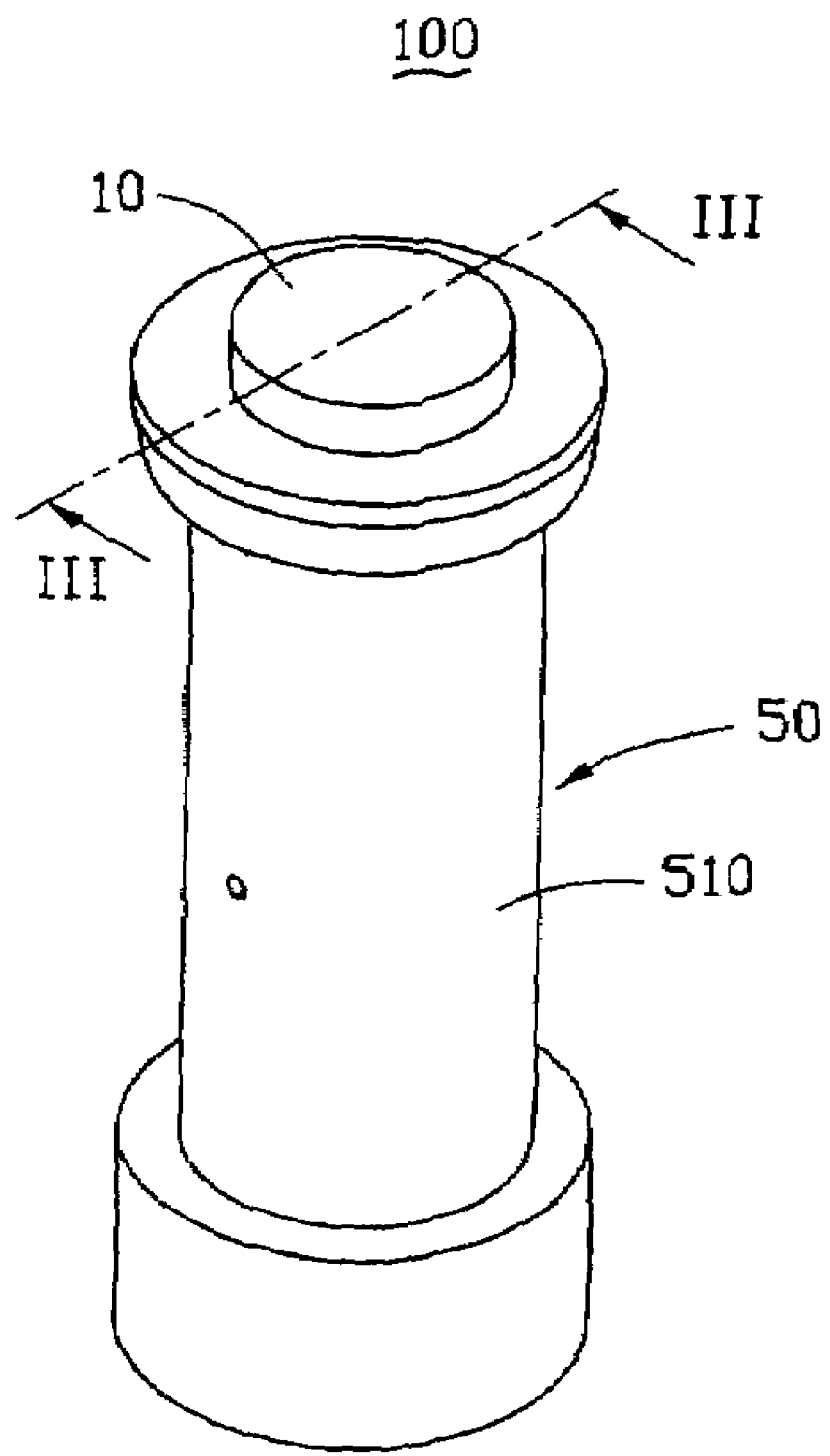
FIG. 2 is a schematic, isometric assembly view of a press-molding mold in accordance with a preferred embodiment.
Figure 3:
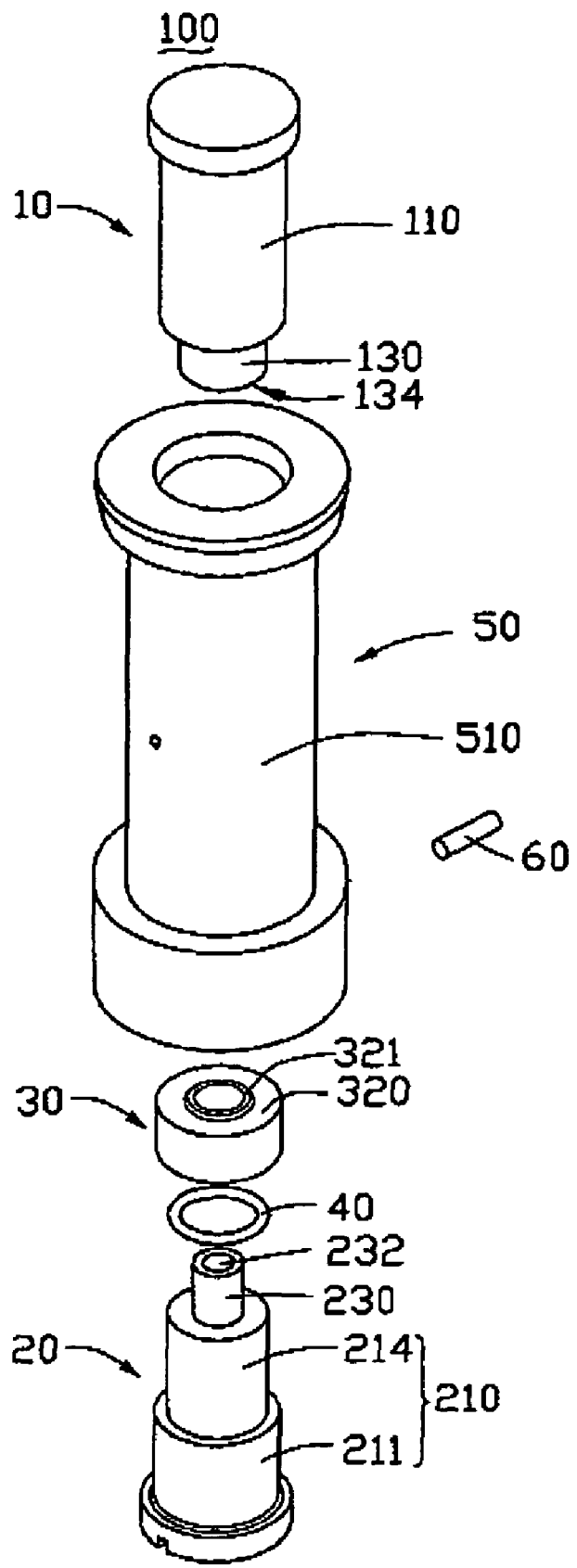
FIG. 3 is a schematic, isometric exploded view of FIG. 2.

Referring to FIGS. 2 to 3, a press-molding mold 100 for making articles includes a first mold 10, a second mold 20, a complementary element 30 located between the first mold 10 and the second mold 20, a washer 40 located between the second mold 20 and the complementary element 30, and a bushing 50 for receiving the first mold 10, the second mold 20, the complementary element 30 and the washer 40 therein. Alternately, between the second mold 20 and the complementary element 30, there may provide a lot of washers 40, according to the practice requirements. In this embodiment, one washer 40 is positioned between the second mold 20 and the complementary element 30.

Figure 4:
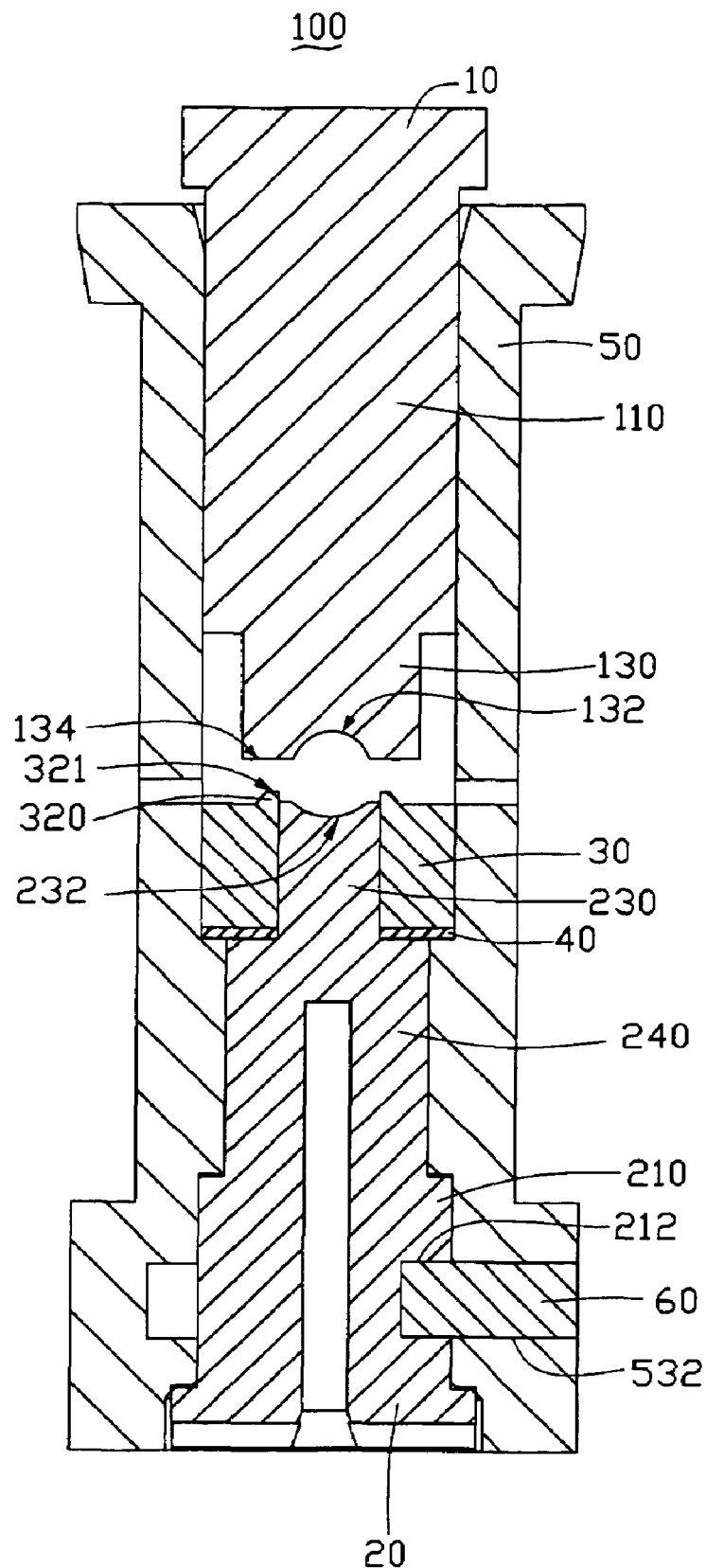
FIG. 4 is a schematic, cross-sectional view taken along line III-III of FIG. 2.

Referring to FIGS. 2 to 4, the first mold 10 includes a first main body 110 and a first molding portion 130. The first molding portion 130 includes a first molding surface 132 and a second molding surface 134. The first molding surface 132 is joined with the second molding surface 134.

The second mold 20 includes a second main body 210 and a second molding portion 230 spatially corresponding to the first molding portion 130 of the first mold 10. The second main body 210 may include a number of cylindrical stages/steps. In this embodiment, the second main body 210 includes a first cylindrical stage 211 and a second cylindrical stage 214 extending from the first cylindrical stage 211. The second molding portion 230 extends from the second cylindrical stage 214 and includes a third molding surface 232 spatially corresponding to the first molding surface 132 of the first molding portion 130. A first positioning hole 212 is defined in the first cylindrical stage 211 of the second mold 20, for receiving a positioning pin 60 latched therein so as to lock the second mold 20 inside the bushing 50.

The complementary element 30 is annular-shaped, which is arranged between the first mold 10 and the second mold 20 and surrounds the second molding portion 230. The complementary element 30 includes a protruding portion 320, which includes a fourth molding surface 321 spatially corresponding to the second molding surface 134.

The washer 40 may be annular-shaped. An internal diameter of the washer 40 may be a little larger than a diameter of the second molding portion 230, thus the washer 40 can be ringed around the second molding portion 230. The washer 40 is arranged between the complementary element 30 and the second mold 20 and has a thickness custom-tailored for maintaining a desired distance between the fourth molding surface 321 and the second molding surface 134. Alternatively, a plurality of washers 40 could be provided. Each washer 40 could have a custom-tailored thickness. As such, one or more washer 40 could be disposed between the complementary element 30 and the second mold 20 so as to maintaining a desired distance between the fourth molding surface 321 and the second molding surface 134. The first mold 10, the second mold 20, the complementary element 30 and the washer 40 can be made of a material selected from the group consisting of tungsten carbide (WC), silicon carbide (SiC), silicon nitrogen ($Si_3N_4$), titanium carbide (TiC) and tungsten cobalt alloy carbide.

The bushing 50 may be cylinder-shaped, and includes a main body 510. A second positioning hole 532 is defined in the main body 510 spatially corresponding to the first positioning hole 212. In assembly, the second mold 20 is positioned inside the bushing 50 by extension of the positioning pin 60 through the second positioning hole 532 and the first positioning hole 212.

In practice, the press-molding mold 100 can be utilized to make an article which has a central portion and an peripheral portion. The first molding surface 132 of the first mold 10 and the third molding surface 232 of the second mold 20 cooperatively define a first cavity for forming a central portion of a desired article, while the second molding surface 134 of the first mold 10 and the fourth molding surface 321 of the complementary element 30 cooperatively define a second cavity for forming an peripheral portion of the desired article. For example, where the article is a glass lens 70 including a central portion 72 and an peripheral portion 74, the central portion 72 of the glass lens 70 is molded by the first molding surface 132 and the third molding surface 232, and the peripheral portion 74 of the glass lens 70 is molded by the second molding surface 134 and the fourth molding surface 321. A thickness of the central portion 72 is equal to a distance between the first molding surface 132 and the third molding surface 232. A thickness of the peripheral portion 74 is equal to a distance between the second molding surface 134 and the fourth molding surface 321 of the complementary element 30.

Figure 5:
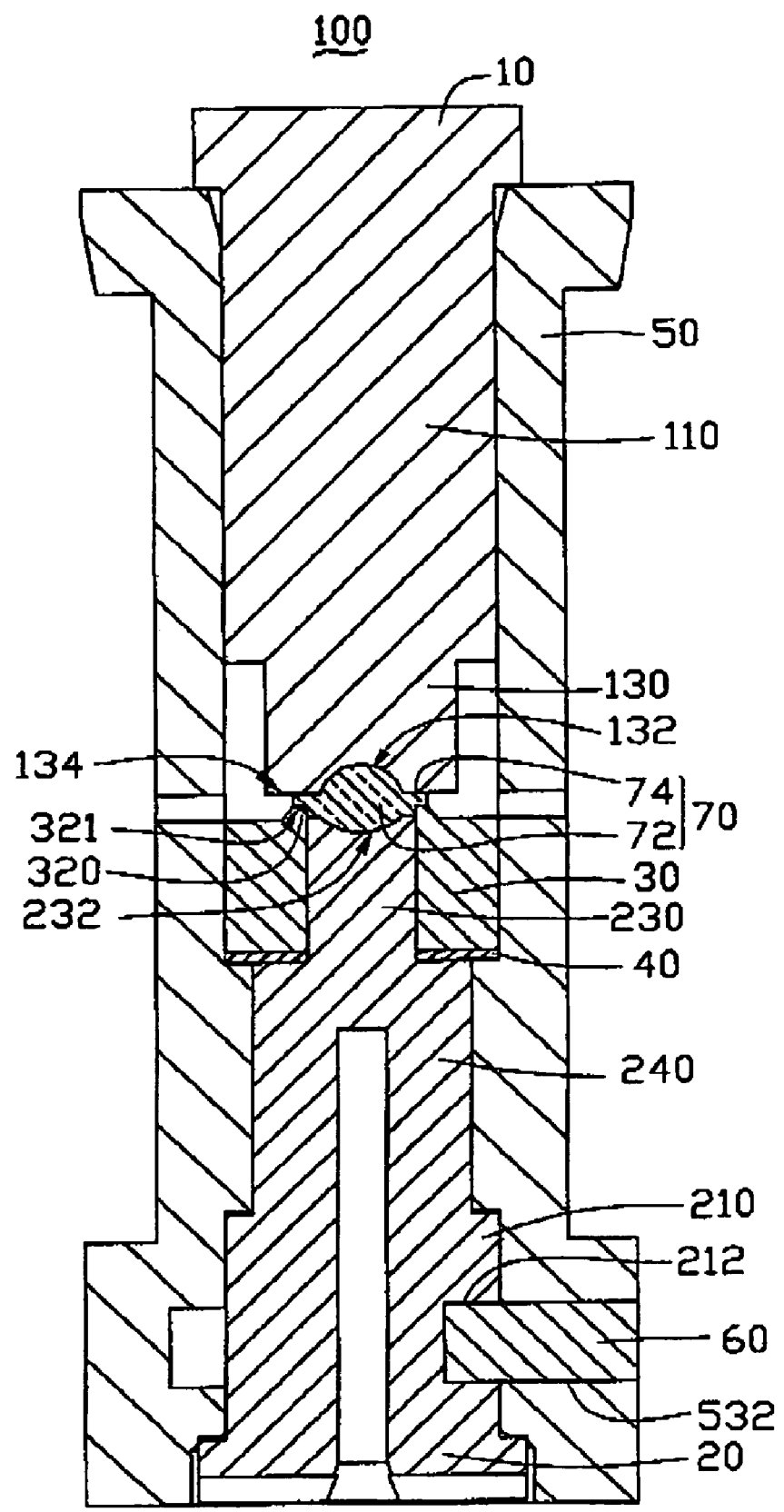
FIG. 5 is similar to FIG. 4, but showing a lens preform being pressed between a first mold and a second mold.

The glass lens 70 may be manufactured by the press-molding mold 100 in following process. Referring to FIG. 4, first, the press-molding mold 100 is assembled into a whole. In a process for assembling the press-molding mold 100, firstly, the second mold 20 is inserted into the bushing 50 from an end having the second positioning hole 532, the second positioning hole 532 substantially spatially corresponding to the first positioning hole 212. Secondly, the second mold 20 is locked inside the bushing 50 by the positioning pin 60 inserted into the second positioning hole 532 and the first positioning hole 212. Thirdly, the washer 40 is inserted into the bushing 50 from another end without the second positioning hole 532 and surrounds the second molding portion 230 of the second mold 20. Fourthly, the complementary element 30 is inserted into the bushing 50 from another end without the second positioning hole 532 and surrounds the second molding portion 230, being arranged on the washer 40. Referring to FIG. 5, finally, a glass lens preform is put on the third molding surface 232 of the second mold 20 and is pressed by the first mold 10 to obtain a desired glass lens.

According to the present press-molding mold 100, the thickness of the central portion 72 can be changed by adjusting the distance between the first molding surface 132 and the third molding surface 232. The thickness of the peripheral portion 74 can be changed by adjusting the distance between the second molding surface 134 and the fourth molding surface 321, which is, in turn, achieved by disposing one or more custom-tailored washers 40 between the complementary element 30 and the second mold 20. In this way, the thickness of the central and peripheral portions of the glass lens 70 can be separately changed, thus the present press-molding mold 100 can manufacture a variety of glass lenses 70 with an equal thickness of the central portion and varying thicknesses of the peripheral portion, or with an equal thickness of the peripheral portion and varying thicknesses of the central portion.

In addition, the present press-molding mold 100 also can manufacture a variety of glass lenses 70 with variously shaped peripheral portions 74. Because the peripheral portion 74 is matched with the second molding surface 134 and the fourth molding surface 321, the shape of the peripheral portion 74 can be changed by changing a shape of the fourth molding surface 321. Therefore, without modifying the structure of the present press-molding mold 100, variously shaped glass lenses 70 can be manufactured.

Compared with the conventional art, the press-molding mold 100 can separately adjust the thickness of the central and peripheral portions of the glass lens, which can improve the precision of the obtained lens. In addition, without modifying the structure of the present press-molding mold 100, various shaped glass lenses can be manufactured, thus reducing manufacturing cost.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A press-molding mold comprising:
    a first mold comprising a first molding surface and a second molding surface surrounding the first molding surface;
    a second mold comprising a third molding surface spatially corresponding to the first molding surface;
    a complementary element configured between the first mold and the second mold, the complementary element comprising a fourth molding surface spatially corresponding to the second molding surface;
    a washer arranged between the second mold and the complementary element, the washer having a thickness custom-tailored configured for maintaining a desired distance between the fourth molding surface and the second molding surface; and
    a bushing for receiving the first mold, the second mold, the complementary element and the washer therein.

2. The press-molding mold as claimed in claim 1, wherein the second mold defines a first positioning hole, the bushing defines a second positioning hole spatially corresponding to the first positioning hole, the first mold inside the bushing by extension of a positioning pin through the second positioning hole and the first positioning hole.

3. The press-molding mold as claimed in claim 1, wherein the first mold comprises a first main body and a first molding portion extending therefrom.

4. The press-molding mold as claimed in claim 1, wherein the second mold comprises a second main body and a second molding portion extending therefrom.

5. The press-molding mold as claimed in claim 1, wherein the complementary element comprises a protruding molding portion with the fourth molding surface defined thereon.

6. The press-molding mold as claimed in claim 4, wherein the washer surrounds the second molding portion of the second mold.

7. The press-molding mold as claimed in claim 6, wherein the complementary element is arranged on the washer and surrounds the second molding portion of the second mold.

8. A press-molding mold for making an article having a central portion and a peripheral portion surrounding the central portion, comprising:
- a first mold having a first molding surface and a second molding surface surrounding the first molding surface;
- a second mold having a third molding surface spatially corresponding to the first molding surface, the first molding surface and the third molding surface being cooperatively configured for forming the central portion of the article;
- a complementary molding element configured between the first mold and the second mold, the complementary molding element comprising a fourth molding surface spatially corresponding to the second molding surface, the second molding surface and the fourth molding surface being cooperatively configured for forming the peripheral portion of the article;
- a washer arranged between the complementary molding element and the second mold, the washer having a thickness custom-tailored configured for maintaining a desired distance between the fourth molding surface and the second molding surface so as to adjust a thickness of the peripheral portion of the article; and
- a bushing for receiving the first mold, the second mold, the complementary element and the washer therein.

9. A press-molding mold for making an article having a central portion and a peripheral portion surrounding the central portion, comprising:
- a first mold having a first molding surface and a second molding surface surrounding the first molding surface;
- a second mold having a third molding surface spatially corresponding to the first molding surface, the first molding surface and the third molding surface being cooperatively configured for forming a central portion of the article;
- a complementary molding element configured between the first mold and the second mold, the complementary molding element comprising a fourth molding surface spatially corresponding to the second molding surface, the second molding surface and the fourth molding surface being cooperatively configured for forming a peripheral portion of the article;
- a plurality of washers arranged between the complementary molding element and the second mold, the washers having a thickness custom-tailored configured for maintaining a desired distance between the fourth molding surface and the second molding surface so as to adjust a thickness of the peripheral portion of the article; and
- a bushing for receiving the first mold, the second mold, the complementary element and the washer therein.

10. The press-molding mold as claimed in claim 8, wherein the first mold comprises a first main body and a first molding portion extending therefrom.

11. The press-molding mold as claimed in claim 8, wherein the second mold comprises a second main body and a second molding portion extending therefrom.

12. The press-molding mold as claimed in claim 11, wherein the washer surrounds the second molding portion of the second mold.

13. The press-molding mold as claimed in claim 8, wherein the complementary element comprises a protruding molding portion with the fourth molding surface defined thereon.

14. The press-molding mold as claimed in claim 9, wherein the first mold comprises a first main body and a first molding portion extending therefrom.

15. The press-molding mold as claimed in claim 9, wherein the second mold comprises a second main body and a second molding portion extending therefrom.

16. The press-molding mold as claimed in claim 15, wherein the washer surrounds the second molding portion of the second mold.

17. The press-molding mold as claimed in claim 9, wherein the complementary element comprises a protruding molding portion with the fourth molding surface defined thereon.

* * * * *